June 23, 1964  B. FLOWER  3,137,947
CORRECTABLE DIMENSIONAL AND CENTER MARKING GAUGE
Filed Aug. 15, 1961  2 Sheets-Sheet 1

*INVENTOR.*
BURL FLOWER
BY Salvatore G. Militano
attorney

June 23, 1964 B. FLOWER 3,137,947
CORRECTABLE DIMENSIONAL AND CENTER MARKING GAUGE
Filed Aug. 15, 1961 2 Sheets-Sheet 2

INVENTOR.
BURL FLOWER
BY Salvatore G. Militana,
Attorney

United States Patent Office 3,137,947
Patented June 23, 1964

3,137,947
CORRECTABLE DIMENSIONAL AND CENTER MARKING GAUGE
Burl Flower, 8852 SW. 17th Terrace, Miami, Fla.
Filed Aug. 15, 1961, Ser. No. 131,580
3 Claims. (Cl. 33—191)

This invention relates to a drawing instrument and is more particularly directed to a precision instrument for the lithographic industry.

The present invention is utilized by both layout artists and lithographic strippers for executing geometrically square and dimensionally accurate register marks at all four corners of a layout, particularly those of larger sizes, and at the same time marking an accurate center for all four sides. At the present time layout artists and lithographic strippers are left to their own choice of tools, such as T-squares, triangles, measuring scales, dividers and the like in attempting to accomplish layout functions with the usual result of inaccurate layouts.

This present device may be used on at least three sides of all paste up material, such as drawings and reproduction proofs of type matter for quick and accurate alignment in art layout and scribing center lines on negatives to be positioned on masks accurately. The corner register marks become useful as accurately positioned trim lines by which the finished sheet becomes trimmed to size. This device is useful in producing any number of layouts in exact duplication since the device may be locked in position. This is important when superimposing different colors accurately, and in those instances when various portions of the copy matter must be superimposed separately. Also, special layouts can be effected by the present invention, such as placing pages off-center to allow for binding without error of duplicate measurement which occurs constantly when the usual drawing instruments are used.

Therefore, a principal object of the present invention is to provide an instrument that is capable of readily effecting a geometrically accurate rectangle to exact size required without measurement with automatically drawn center lines.

Another object of the present invention is to provide a dimensional and centermarking gauge that is capable of producing any number of layouts in exact duplication.

Another object of the present invention is to provide a dimensional and center marking gauge for layout artists and lithographic strippers which is simple in construction and operation and extremely accurate in its results since it is dimensionally corrected to an extended ball point pen which under normal use cannot be varied at the tangent point manually and, whereby time and labor costs are reduced to a minimum.

With these and other objects in view, the invention will be best understood from a consideration of the following detailed description taken in connection with the accompanying drawings forming a part of this specification, with the understanding, however, that the invention is not confined to any strict conformity with the showing of the drawings but may be changed or modified so long as such changes or modifications mark no material departure from the salient features of the invention as expressed in the appended claims.

Figure 2:
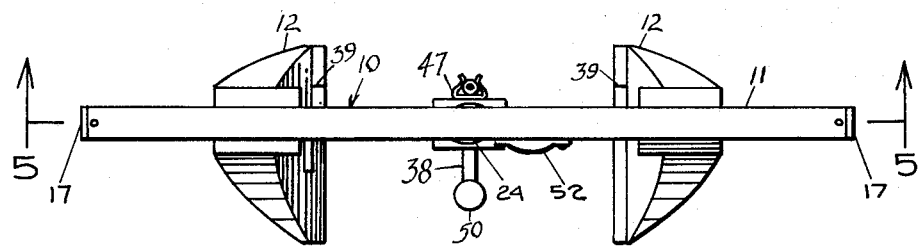
FIGURE 2 is a top plan view thereof.

Referring to the drawings wherein like numerals are used to designate similar parts throughout the several views, the numeral 10 refers to my correctable dimensional and center marking gauge consisting of an elongated body member 11 supported on a pair of leg members 12 that are slidably mounted thereon. The leg members 12 are each provided with an open top slotted portion 13 formed by upstanding side walls 14 between which the elongated body member 11 extends.

Figure 5:
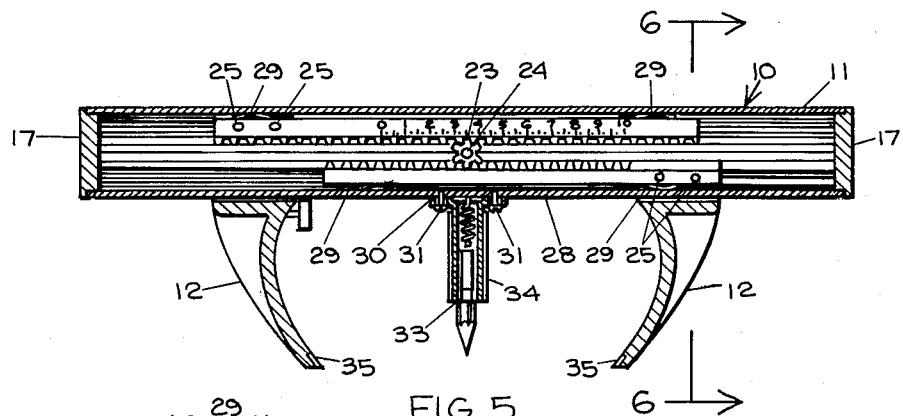
FIGURE 5 is a longitudinal cross sectional view taken along the line 5—5 of FIGURE 2.
Figure 6:
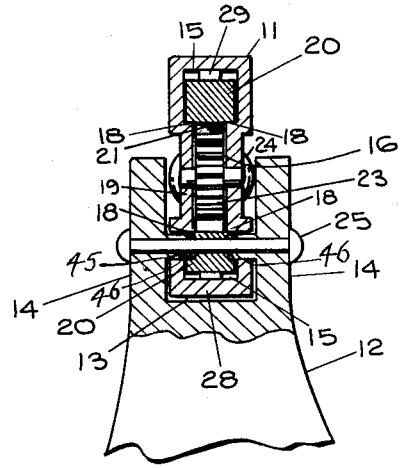
FIGURE 6 is a detailed cross sectional view taken along the line 6—6 of FIGURE 5.

The elongated body member 11 is an extruded member having upper and lower rectangular chambers 15 connected by a slightly narrower chamber 16, all of which chambers 15 and 16 extend along the full length of the body member 11 with caps 17 secured to the ends of the elongated body member 11, as best shown by FIGURE 5. The juncture of the chambers 15 and 16 forms a pair of oppositely positioned shoulders 18 at the upper chamber 15 and at the lower chamber 15. See FIGURE 6.

Within the chambers 15 are racks 20 slidably positioned having their teeth portion 21 positioned within the chamber 16. The racks 20 rest on the shoulders 18 and are provided with a plurality of imbedded bearing members 22 which slide smoothly over the shoulders 18 when the racks 20 are made to slide along the elongated body member 11. Each of the two racks 20 is provided with a pair of bearing members 22, one on each shoulder and near the ends away from gear 23. With only the bearing members 22 in contact and sliding smoothly on shoulders 18, while the teeth of the gear 23 and racks 20 are fully in mesh under pressure from springs 29, the racks 20 remain accurately parallel with shoulders 18 and the rack and leg assemblies can accomplish a complete and true lateral motion without binding or "riding up" on the gear 23. A plurality of leaf springs 29 having one end secured to the outer surfaces of the racks 20 and the other end yieldingly engaging the inner surface of the elongated body member 11 urge the bearing members 22 to bear against the shoulders 18. There is one leaf spring 29 at each end of each of the racks 20.

At the mid-portion of the elongated body member 11 is a pinion gear 23 pivotally mounted on a pin 24 and in mesh engagement with the teeth 21 of both of the racks 20 so that racks 20 are compelled to always move in unison. The racks 20 are secured to the leg members 12 by screw bolts 25 which extend through slots 26 and 27 formed in the side walls 19 of the elongated body member 11. It is to be noted that one pair of slots 26 is on the upper portion of the elongated body member 11 while the other pair of slots 27 is positioned on the lower portion of the body member 11, while all of the slots 26 and 27 extend from the end of the elongated body member 11 to the mid-portion thereof.

To insure that there be no relative movement between the individual leg members 12 and the racks 20 that would cause the former to bind or to lose dimensional accuracy, each side of the racks 20 is provided with a slotted portion 45 in alignment with the slots 26, 27 in the body member 11. The leg portions 12 are provided with wedge shaped ridge portions 46 which are received by the slot 45 whereupon the tightening of the bolts 25, the ridge portions 46 become wedged in the slots 45. The leg members 12 and the racks 20 then move in unison when the lower portion of the leg members 12 are grasped and pushed in a direction to and from each other. At the bottom portion of each of the leg member 12 is a straight edge 35 for drawing lines. A line indicated by the marking 39 on the straight edges 35 is for placing the gauge 10 in an aligned position. The straight edges 35 are positioned at right angle to the elongated body member 11.

Figure 7:
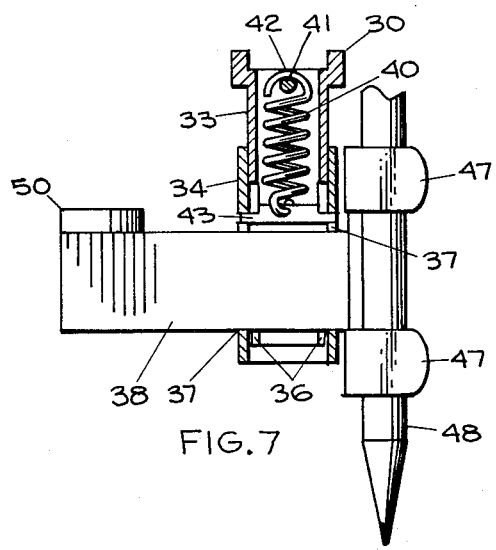
FIGURE 7 is an enlarged and cross sectional view of the marking implement holder.
Figure 8:
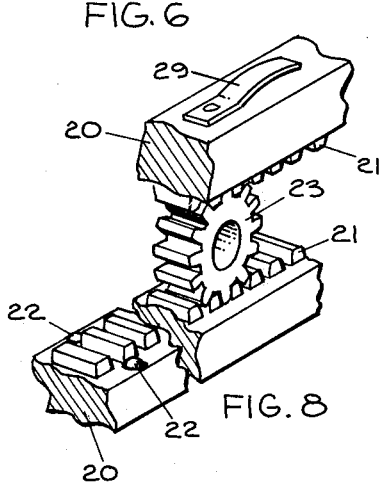
FIGURE 8 is a fragmentary perspective view of the racks and pinion gear arrangement.

Means are provided for indicating and marking the center position of the gauge 10 comprising a bracket 30 secured by bolts 31 to a bottom wall 28 of the body member 11. The bolts 31 extend through elongated bores 32 on the bracket 31 to permit adjustment to center of the bracket 31. A cylindrical support member 33 is secured to the bracket 30 and extends therebelow having a second cylindrical member 34 telescopically mounted thereon. Aligned slots 36 and 37 formed in the cylindrical members 33 and 34 receive a horizontally disposed support bar 38 which extends therethrough. The slots 36 in the cylindrical support member 33 extend through the lower edge of the member 33 while the slots 37 in the cylindrical member 34 terminate adjacent to the lower edge portion so that movement of the support bar 38 will compel the bar 38 and the telescopic member 34 to slide vertically in unison with relation to the cylindrical support member 33 as best shown by FIGURES 5 and 7. A spring 40 mounted within the support member 33 has its upper end engaged to a bridge member 41 mounted in slots 42 formed in the top edge of the cylindrical support member 33. The lower end of the coil spring 40 is received by a second bridge member 43 having arm portions received by the slots 37 in the second cylindrical member 34. At one end of the support bar 38 there is secured a pair of vertically aligned resilient clips 47 for receiving a ball point pen, stylus or any like marking device 48. At the other end of the support bar 38 is a thumb plate 50. The coil spring 40 normally maintains the support bar 38 and pen 48 in the upper position above the surface upon which the gauge 10 is resting. When it is desired to make a mark or draw a line, the operator presses downwardly on the thumb plate 50 causing the coil spring 40 to yield and the support bar 38 along with the telescopic member 34 and pencil 48 will slide downwardly until the pencil point 48 reaches the surface to be marked. If a line is to be made, the support bar 38 is pushed horizontally, causing the support bar 38 to slide horizontally in the slots 36, 37 and the pen 48 will now move along the surface and trace a line thereon.

In order to readily ascertain the distance between the straight edges 35 at all positions thereof, the upper rack 20 is graduated along its side wall in inches and fractions of an inch at half scale. An opening 51 is formed in the side wall of the body member 11 in alignment with the aforementioned graduations with a magnifying glass or window 52 mounted over the opening 51. The glass 52 is provided with elongated bores 53 to permit adjustment of the glass 52 in fastening the latter to the body member 11 by bolts 54. A center hair line 55 is marked vertically on the magnifying glass 52 to indicate the exact measurement or distance between the straight edges 35 of the leg members 12.

Figure 1:
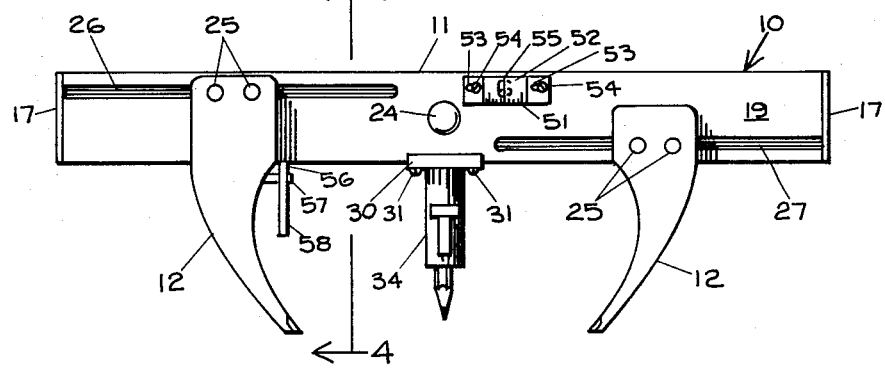
FIGURE 1 is a side elevational view of a dimensional gauge constructed in accordance with my invention.
Figure 3:
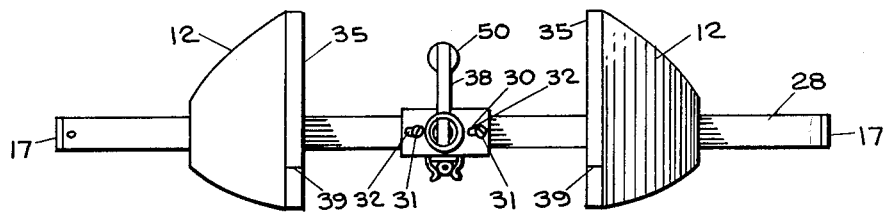
FIGURE 3 is a bottom plan view.
Figure 4:
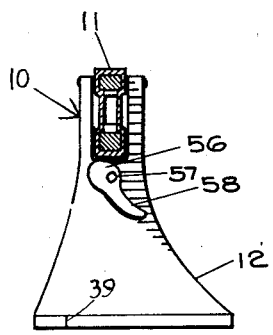
FIGURE 4 is a transverse cross sectional view taken along the line 4—4 of FIGURE 1.

After the dimensional gauge 10 has been set on a proposed layout, the leg members 12 are grasped by the operator and moved and locked at the required dimension. Marks are then drawn at the straight edges 35. The position of the pen 48 will be at the exact center line of the layout with the straight edges 35 lying over a bottom line of the layout with the marks 39 aligned accurately thereon. The thumb plate 50 is depressed to cause the pen 48 to be depressed to the layout and a mark is made on the layout. If a centerline is desired, the support bar 38 is slid horizontally and a centerline will be made on the layout. At the same time a mark can be made at the position of the straight edges 35 to mark the position of the margins of the layout. If these markings are to be repeated, the device 10 may be locked in position by a cam member 56 pivotally mounted on a free end of a pin 57 whose other end is secured to one of the leg members 12 as best shown by FIGURES 1 and 4. The cam member 56 is actuated by a handle 58 which is actuable by an operator's thumb when it is desired to lock the leg members 12 in position. Pressure on the handle 58 causes the cam member 56 to rotate about the pivot pin 57 and engage the lower surface 20 of the elongated body member 11. The leg members 12 are now locked against movement with relation to the elongated body member 11.

What I desire to secure by Letters Patent of the United States is:

1. A device of the class described comprising an elongated body member, said body member having an upper and a lower chamber of substantially identical cross section extending substantially the full length of said body member, a pair of aligned shoulder portions mounted in each of said chambers, a rack positioned in each of said chambers and slidably positioned on said pair of shoulder portions, a pinion gear rotatably mounted in said elongated body member at substantially its mid portion in mesh engagement with said racks for unitary movement of said racks, spring means yieldingly urging said racks into mesh engagement with said pinion gear, said elongated body member having a pair of slots in alignment with each of said racks, a pair of substantially upright and arcuate leg members having lower portions terminating in substantially parallel edge portions for guiding an instrument in marking the position of said edge portion, each of said leg members having a slotted portion at their upper portion receiving said elongated body member, means extending through said aligned slots securing each of said leg members to one of said racks, marking support means adjustably mounted on said elongated body portion at said midportion for receiving a marking instrument, locking means mounted on one of said leg members for engaging said elongated body member and preventing movement of said racks in said elongated body member, said elongated body member having an opening permitting the viewing of one of said racks, said one of said racks having a plurality of graduations thereon, a transparent member having a marking thereon, said transparent member having a pair of elongated openings, and fastening members received by said elongated openings adjustably securing said transparent member on said body member, for dimensionally correcting the position of said parallel edge portions in an approximate amount substantially equal to the size of the marking instrument being used.

2. A device of the class described comprising an elongated body member, said body member having an upper and a lower chamber of substantially identical cross section extending substantially the full length of said body member, a pair of aligned shoulder portions mounted in each of said chambers, a rack positioned in each of said chambers and slidably positioned on said pair of shoulder portions, a pinion gear rotatably mounted in said elongated body member at substantially its mid-portion in mesh engagement with said racks for unitary movement of said racks, spring means yieldingly urging said racks into mesh engagement with said pinion gear, said elongated body member having a pair of slots in alignment with each of said racks, a pair of leg members, each of said leg members having a slotted portion receiving said elongated body member, means extending through said aligned slots securing each of said leg members to one of said racks, a support member adjustably mounted on a lower wall of said elongated body member at said mid-portion, a tubular member secured to said support member and depending therebelow, a second tubular member telescopically mounted on said first named tubular member, said tubular members having aligned slots disposed vertically, a support bar extending through said slots and being horizontally and slidably positioned therein, a coil spring positioned vertically in said first named tubular member, means securing the upper end of said coil spring to said first named tubular member, further means securing the lower end of said coil spring to said second tubular member whereby said coil spring yieldingly urges said second tubular member in an upper position on said first named tubular member, and means mounted on said support bar for releasably receiving a marking instrument.

3. A device of the class described comprising an elongated body member, said body member having an upper and a lower chamber of substantially identical cross section extending substantially the full length of said body member, a pair of aligned shoulder portions mounted in each of said chambers, a rack positioned in each of said chambers and slidably positioned on said pair of shoulder portions, a pinion gear rotatably mounted in said elongated body member at substantially its mid-portion in mesh engagement with said racks for unitary movement of said racks, spring means yieldingly urging said racks into mesh engagement with said pinion gear, said elongated body member having a pair of slots in alignment with each of said racks, a pair of leg members, each of said leg members having a slotted portion receiving said elongated body member, means extending through said aligned slots securing each of said leg members to one of said racks, a support member adjustably mounted on a lower wall of said elongated body member at said mid-portion, a tubular member secured to said support member and depending therebelow, a second tubular member telescopically mounted on said first named tubular member, said tubular members having aligned slots disposed vertically, a support bar extending through said slots and being horizontally and slidably positioned therein, a coil spring positioned vertically in said first named tubular member, means securing the upper end of said coil spring to said first named tubular member, further means securing the lower end of said coil spring to said second tubular member whereby said coil spring yieldingly urges said second tubular member in an upper position on said first named tubular member, means mounted on said support bar for releasably receiving a marking instrument, a pivot pin mounted on one of said leg members in proximity of said lower wall of said elongated body member, a cam member pivotally mounted on said pivot pin, and a handle member for rotating said cam member whereby said cam member will engage said lower wall and lock said leg members against movement on said elongated body member.

References Cited in the file of this patent

UNITED STATES PATENTS

| | | |
|---|---|---|
| 452,019 | Pedersen | May 12, 1891 |
| 597,915 | Roosa | Jan. 25, 1898 |
| 1,067,877 | Needham | July 22, 1913 |
| 1,187,658 | Sauerhering | June 20, 1916 |
| 1,231,934 | Packet | July 3, 1917 |
| 2,599,819 | Fisher | June 10, 1952 |
| 2,867,042 | Sutton | Jan. 6, 1959 |
| 2,954,703 | Morrell | Oct. 4, 1960 |

FOREIGN PATENTS

| | | |
|---|---|---|
| 447,755 | Canada | Apr. 13, 1948 |
| 606,431 | France | Mar. 9, 1926 |